United States Patent
Reatti

(10) Patent No.: US 6,640,966 B2
(45) Date of Patent: Nov. 4, 2003

(54) GUIDE STRUCTURE WITH SERPENTINE ELEMENTS FOR THE RETURN SECTION OF ENDLESS CONVEYORS

(75) Inventor: Rodolfo Reatti, Brivio (IT)

(73) Assignee: System Plast S.p.A., Telgate (IT)

( * ) Notice: Subject to any disclaimer, the term of this patent is extended or adjusted under 35 U.S.C. 154(b) by 0 days.

(21) Appl. No.: 09/996,212

(22) Filed: Nov. 28, 2001

(65) Prior Publication Data

US 2002/0063044 A1 May 30, 2002

(30) Foreign Application Priority Data

Nov. 30, 2000 (IT) .................................... MI20000674 U

(51) Int. Cl.⁷ .............................................. B65G 15/60
(52) U.S. Cl. ...................................................... 198/841
(58) Field of Search .......................................... 198/841

(56) References Cited

U.S. PATENT DOCUMENTS

| | | | | |
|---|---|---|---|---|
| 4,325,480 A | * | 4/1982 | Butt ........................... | 198/841 |
| 5,190,145 A | * | 3/1993 | Ledginham et al. ........ | 198/841 |
| D340,564 S | * | 10/1993 | Ledingham ............... | 222/465.1 |
| 5,310,047 A | * | 5/1994 | Ledingham ................. | 198/841 |
| 6,269,939 B1 | * | 8/2001 | Lapeyre et al. ............. | 198/615 |

* cited by examiner

Primary Examiner—Christopher P. Ellis
Assistant Examiner—Richard Ridley
(74) Attorney, Agent, or Firm—Steinberg & Raskin, P.C.

(57) ABSTRACT

A support structure for the return section of at least one conveyor, comprising including serpentine slat elements, support members for supporting said serpentine elements, and transverse members to which the support members are coupled, each slat element (1) being supported independently of the others by its own independent support members (2, 3); the support members (2, 3) comprise, on their lower edge, means (5, 5A) for their snap-coupling to the transverse members (6); the snap-coupling means being formed in such a manner as to enable the support members to be coupled by pressing them onto the transverse members downwards from above.

4 Claims, 1 Drawing Sheet

GUIDE STRUCTURE WITH SERPENTINE ELEMENTS FOR THE RETURN SECTION OF ENDLESS CONVEYORS

BACKGROUND OF THE INVENTION

The present invention relates to a support structure for the return section of endless conveyors, comprising elements which can laterally be defined as slats of serpentine extension, support members for supporting said serpentine elements, and transverse members for supporting the support members.

In the known art each support member, generally of reinforced engineering polymer, supports at least two serpentine slat elements and also acts as their spacer. The support members are snap-coupled to the transverse members (generally formed from tubes, for example of metal, mounted side by side), with some of them, namely those present at the front or rear end of the support structure, presenting a lead-in face for the initial contact and sliding of the conveyor.

OBJECTS AND SUMMARY OF THE INVENTION

The known solution has certain drawbacks which it is the main object of the present invention to eliminate, these being its relative design inflexibility, its relative high cost and the laboriousness of its required maintenance.

This and further objects which will be apparent from the ensuing detailed description are attained by a structure with substantially slat-like serpentine supports, the innovative aspect of which is highlighted in the appended claims.

BRIEF DESCRIPTION OF THE DRAWINGS

The invention will be more apparent from the detailed description given hereinafter by way of non-limiting example with reference to the accompanying drawings, in which.

DETAILED DESCRIPTION OF THE INVENTION

Figure 1:
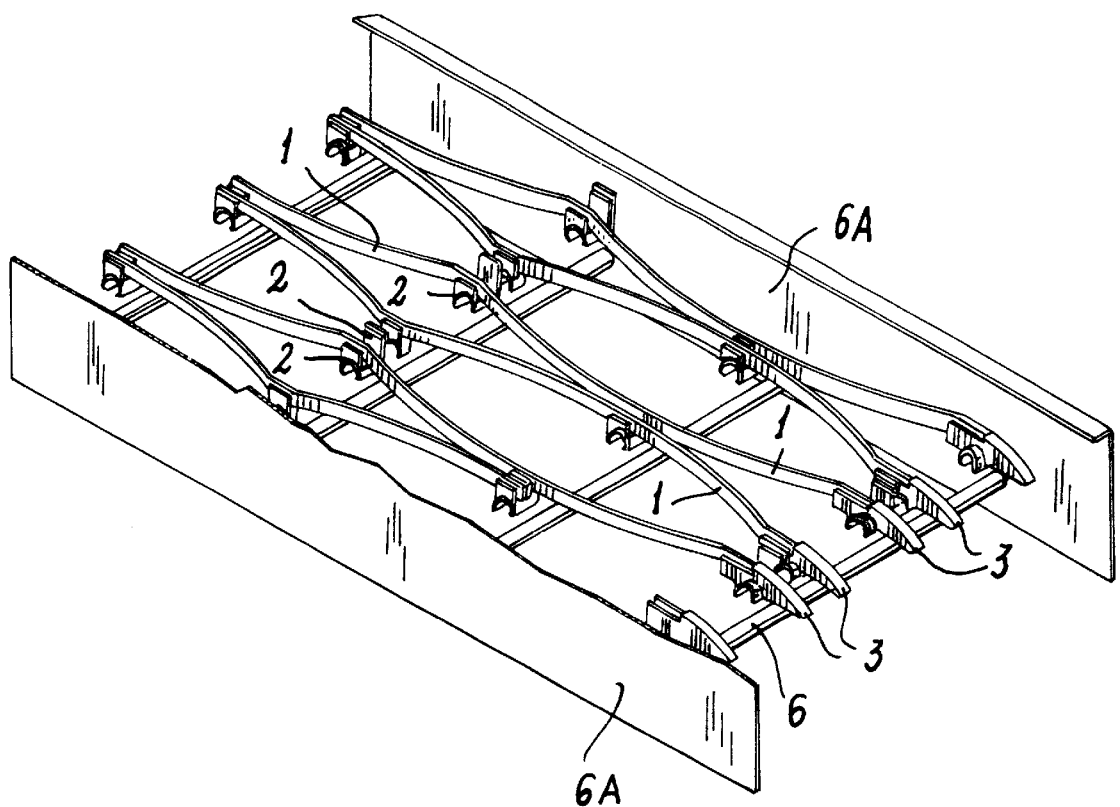
FIG. 1 is a perspective view of the support structure of the invention.

As can be seen from FIG. 1, a feature of the support structure of the present invention is that each of its individual serpentine slat elements is independent of the others in the sense that it does not share with other serpentine slat elements either the relative support members 2, or the lead-in end shoes 3.

Both the support members 2 and the lead-in shoes 3 present rectilinear slots 4 which forcibly receive the relative slat element 1, and on the opposite side (the lower side when in use) they present seats 5 to enable them to be snap-coupled to the transverse members 6 represented by tubes or bars of circular cross-section, supported by sidepieces 6A. To couple the members 2 and shoes 3 together and to the transverse members 6, the coupling means for the members 2 and shoe 3 are formed in such a manner as to enable said members and shoes to be applied to the transverse members by pressing them downwards from above.

The slat elements 1 are flexible (preferably of polyethylene) and can adapt to the serpentine configuration (exemplified in FIG. 1) imposed on them by the positions given to the relative support members 2 on the transverse members 6A.

Figure 2:
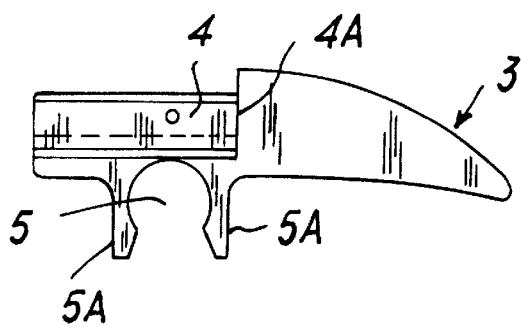
FIG. 2 is a side view of an end shoe.

As can be seen from FIG. 2, the lead-in shoe 3 has its relative slot 4 dead-ended at 4A, and the seat 6 is fork-shaped, with elastic arms 5A and a narrow entry but shaped with a lead-in to facilitate its snap-coupling to the transverse members 6. The shoe projects beyond its coupling seat 5 with a part defined by converging upper and lower sides, of which the upper side is clearly convex in shape. The shoe material is preferably polyamide (possible filled or reinforced).

Figure 3:
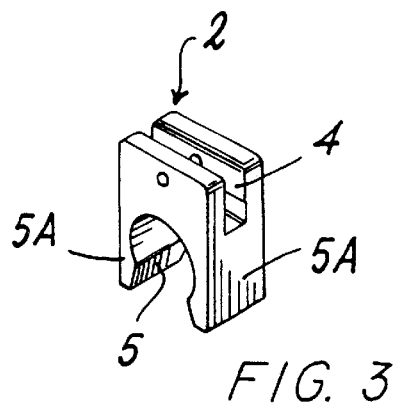
FIG. 3 is a perspective view of a support member.

In the support member 2 of FIG. 3 the slot 4 is a through slot, and on the opposite side has its coupling seat 5 substantially equal to that of the shoe 3. The material of the support members 2 is preferably the same as that of the shoe 3.

I claim:

1. A support structure for the return section of at least one conveyor, comprising:

serpentine slat elements, support members for supporting said serpentine elements, and transverse members to which the support members are coupled, wherein each slat element (1) is supported independently of the other slat elements by its own independent support members (2, 3); the support members (2, 3) comprise, on their lower edge, means (5, 5A) for their snap-coupling to the transverse members (6); the snap-coupling means being formed in such a manner as to enable the support members to be coupled by pressing them onto the transverse members downwards from above; and wherein each slat element (1) terminates, at an entry end of the structure, with its own independent support member shaped as a lead-in shoe (3).

2. A structure as claimed in claim 1, wherein the support members (2) comprise along their upper visible edge a slot (4) dedicated only to accepting the slat element (1).

3. A shoe for the support structure of a return section of at least one endless conveyor, the support structure comprising serpentine slat elements, support members for supporting said slat elements, and transverse members to which said support members are coupled, said shoe comprising:

a shoe member shaped with a lead-in and being structured and arranged for supporting a single slat element at one of its ends, independently of the other slat elements and wherein said shoe, further comprises on its lower edge, means (5A) for its snap-coupling said shoe member to the transverse members (6) downwards from above.

4. A shoe as claimed in claim 3, further comprising a dead slot (4) for accepting the slat element.

* * * * *